US009227214B2

(12) United States Patent
Baldwin et al.

(10) Patent No.: US 9,227,214 B2
(45) Date of Patent: Jan. 5, 2016

(54) ADJUSTABLE GAS DISTRIBUTION ASSEMBLY AND RELATED ADJUSTABLE PLASMA SPRAY DEVICE

(71) Applicant: General Electric Company, Schenectady, NY (US)

(72) Inventors: Donald Joseph Baldwin, Galway, NY (US); Joseph Garfield Albanese, Rotterdam Junction, NY (US); Stephen David Dillon, Duanesburg, NY (US); James Allen Fisk, II, Gansevoort, NY (US)

(73) Assignee: General Electric Company, Schenectady, NY (US)

( * ) Notice: Subject to any disclaimer, the term of this patent is extended or adjusted under 35 U.S.C. 154(b) by 350 days.

(21) Appl. No.: 13/800,131

(22) Filed: Mar. 13, 2013

(65) Prior Publication Data

US 2014/0263761 A1 Sep. 18, 2014

(51) Int. Cl.
*B23K 10/00* (2006.01)
*B05B 12/00* (2006.01)
*H05H 1/34* (2006.01)

(52) U.S. Cl.
CPC .................. *B05B 12/00* (2013.01); *H05H 1/34* (2013.01); *H05H 2001/3468* (2013.01); *H05H 2001/3478* (2013.01)

(58) Field of Classification Search
CPC ....................................................... B23K 10/00
USPC ................ 219/121.47, 121.48, 121.49, 121.5
See application file for complete search history.

(56) References Cited

U.S. PATENT DOCUMENTS

| | | | | |
|---|---|---|---|---|
| 4,661,682 | A | 4/1987 | Gruner et al. | |
| 8,237,079 | B2 | 8/2012 | Lochner et al. | |
| 2006/0108332 | A1 | 5/2006 | Belashchenko | |
| 2011/0042358 | A1 * | 2/2011 | Albanese et al. | 219/121.5 |
| 2011/0049110 | A1 * | 3/2011 | Lochner et al. | 219/121.5 |
| 2012/0055907 | A1 * | 3/2012 | Allimant et al. | 219/121.51 |

FOREIGN PATENT DOCUMENTS

| | | | |
|---|---|---|---|
| EP | 0171793 | A2 | 2/1986 |
| WO | 2010103497 | A2 | 9/2010 |

OTHER PUBLICATIONS

European Search Report and Opinion issued in connection with corresponding EP Application No. 14158672.7 on Dec. 18, 2014.

* cited by examiner

*Primary Examiner* — Brian Jennison
(74) *Attorney, Agent, or Firm* — Ernest G. Cusick; Hoffman Warnick LLC

(57) ABSTRACT

Various embodiments include an adjustable gas distribution assembly for an adjustable plasma spray device. In one embodiment, the assembly includes: a first gas distribution ring including a plurality of openings allowing a gas to pass to an inner diameter thereof, the first gas distribution ring including a mating surface upstream of the plurality of openings; and a positioning ring axially aligned with the gas distribution ring between the first gas distribution ring and an electrically charged outlet of the plasma spray device, wherein the positioning ring includes a mating surface that mates with the mating surface of the first gas distribution ring to form the gas distribution assembly, wherein the mating surface of the positioning ring is sized to mate with a plurality of distinct gas distribution rings including the first gas distribution ring.

17 Claims, 12 Drawing Sheets

100

| Plasma spray gun nozzle | Ratio of La/Ld | Arc Length (La)(in) | Divergence length (Ld)(in) | Overall nozzle length (in) | Maximum power (kW) |
|---|---|---|---|---|---|
| Nozzle 200 | 2.7 | 3.00 | 1.12 | 4.12 | 200 |
| Nozzle 150 | 1.6 | 2.06 | 1.25 | 3.31 | 150 |
| Nozzle 100 | 1.5 | 1.50 | 1.00 | 2.50 | 100 |
| Nozzle 50 | 0.9 | 0.79 | 0.90 | 1.69 | 50 |

FIG. 7

ADJUSTABLE GAS DISTRIBUTION ASSEMBLY AND RELATED ADJUSTABLE PLASMA SPRAY DEVICE

FIELD OF THE INVENTION

The subject matter disclosed herein relates to plasma spray technology. More particularly, the subject matter disclosed herein relates to an adjustable plasma spray device and related assemblies.

BACKGROUND OF THE INVENTION

Thermal spraying is a coating method wherein powder or other feedstock material is fed into a stream of heated gas produced by a plasmatron or by the combustion of fuel gases. The hot gas stream entrains the feedstock to which it transfers heat and momentum. The heated feedstock is further impacted onto a surface, where it adheres and solidifies, forming a thermally sprayed coating composed of thin layers or lamellae.

One common method of thermal spraying is plasma spraying. Plasma spraying is typically performed by a plasma torch or gun, which uses a plasma jet to heat or melt the feedstock before propelling it toward a desired surface. Most conventional plasma spray guns operate efficiently (e.g., over 60% efficiency) at one power mode (e.g., 75 kW) and in one position with respect to a specimen. Therefore, when spraying different surfaces and/or different specimens (e.g., at different power requirements), different plasma spray guns, arranged in different positions, may be necessary.

BRIEF DESCRIPTION OF THE INVENTION

Various embodiments include an adjustable gas distribution assembly for an adjustable plasma spray device. In one embodiment, the assembly includes: a first gas distribution ring including a plurality of openings allowing a gas to pass to an inner diameter thereof, the gas distribution ring including a mating surface upstream of the plurality of openings; and a positioning ring axially aligned with the gas distribution ring between the first gas distribution ring and an electrically charged outlet of the plasma spray device, wherein the positioning ring includes a mating surface that mates with the mating surface of the first gas distribution ring to form the gas distribution assembly, wherein the mating surface of the positioning ring is sized to mate with a plurality of distinct gas distribution rings including the first gas distribution ring.

A first aspect of the invention includes an adjustable gas distribution assembly for an adjustable plasma spray device, the assembly including: a first gas distribution ring including a plurality of openings allowing a gas to pass to an inner diameter thereof, the gas distribution ring including a mating surface upstream of the plurality of openings; and a positioning ring axially aligned with the gas distribution ring between the first gas distribution ring and an electrically charged outlet of the plasma spray device, wherein the positioning ring includes a mating surface that mates with the mating surface of the first gas distribution ring to form the gas distribution assembly, wherein the mating surface of the positioning ring is sized to mate with a plurality of distinct gas distribution rings including the first gas distribution ring.

A second aspect of the invention includes an adjustable plasma spray device, having: an electrode body housing an electrode; a plasma spray device body having a fore portion and an aft portion, the aft portion having an axial opening configured to removably attach to one of the electrode or a first coupler; the first coupler removably attached to the plasma spray device body at the axial opening of the plasma spray device body, the coupler including: a first portion having a first axial opening configured to removably attach to the plasma spray gun body; and a second portion having a second axial opening configured to removably attach to one of the electrode body or a second coupler; and an adjustable gas distribution assembly within the plasma spray device body, the adjustable gas distribution assembly including: a first gas distribution ring including a plurality of openings allowing a gas to pass to an inner diameter thereof, the gas distribution ring including a mating surface upstream of the plurality of openings; and a positioning ring axially aligned with the gas distribution ring between the first gas distribution ring and an electrically charged outlet of the plasma spray device body, wherein the positioning ring includes a mating surface that mates with the mating surface of the first gas distribution ring to form the gas distribution assembly, wherein the mating surface of the positioning ring is sized to mate with a plurality of distinct gas distribution rings including the first gas distribution ring.

A third aspect of the invention includes an adjustable plasma spray gun system having: an electrode body housing an electrode; a plasma spray device body having a fore portion and an aft portion, the plasma spray device body housing a nozzle and having an axial opening at the aft portion configured to removably attach to one of the electrode or a coupler; the coupler removably attached to the plasma spray device body at the axial opening of the plasma spray device body, the coupler including: a first portion having a first axial opening configured to removably attach to the plasma spray device body at the aft portion; and a second portion having a second axial opening configured to removably attach to one of the electrode body or a second coupler; and an adjustable gas distribution assembly within the plasma spray device body, the adjustable gas distribution assembly including: a first gas distribution ring including a plurality of openings allowing a gas to pass to an inner diameter thereof, the gas distribution ring including a mating surface upstream of the plurality of openings; and a positioning ring axially aligned with the gas distribution ring between the first gas distribution ring and an electrically charged outlet of the plasma spray device body.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 7 shows a table including data about example nozzles used according to embodiments of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
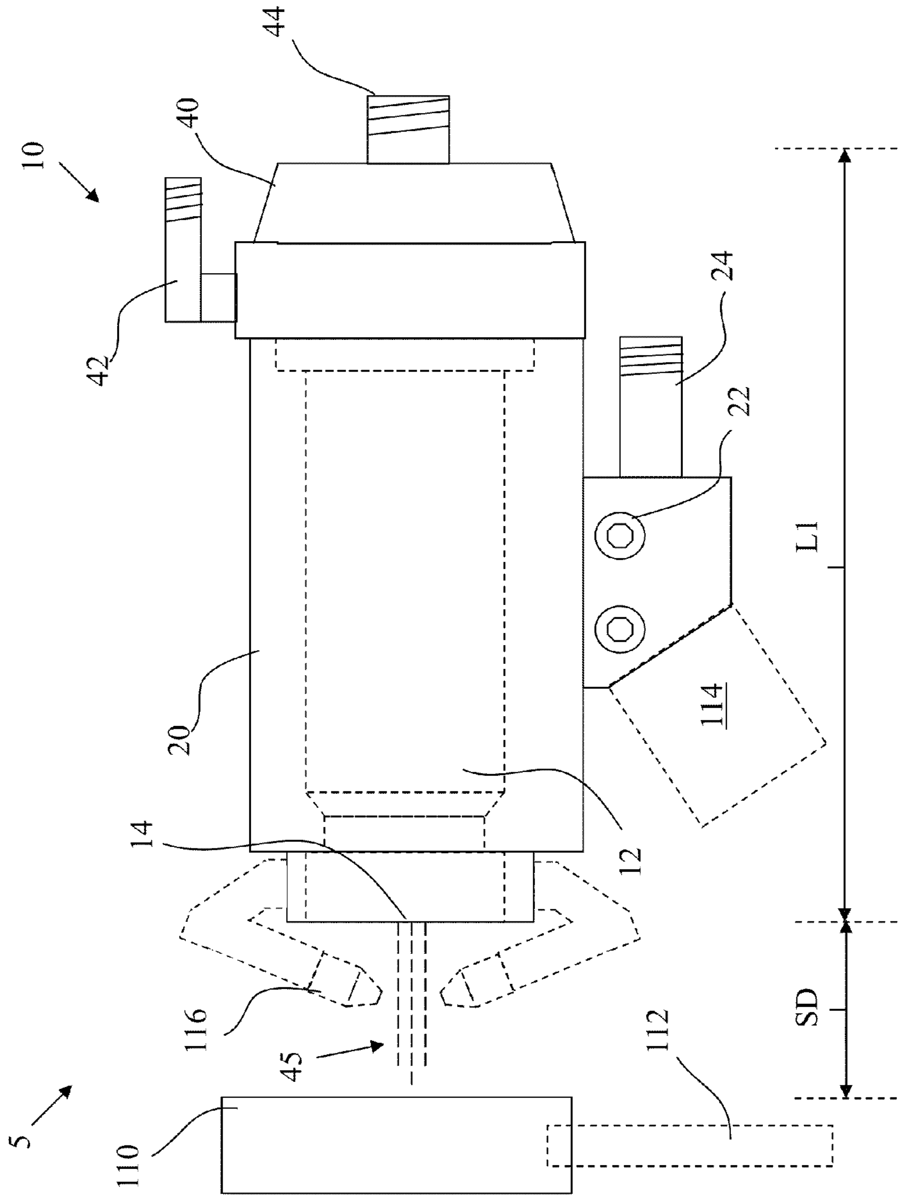
FIG. 1 shows a side view of a plasma spray gun system according to an embodiment of the invention.

As indicated above, aspects of the invention provide for an adjustable gas distribution assembly for an adjustable plasma spray device. In particular embodiments described herein, the adjustable plasma spray device is a plasma gun.

As used herein, the terms "axial" and/or "axially" refer to the relative position/direction of objects along axis A, which is substantially parallel with the axis of propulsion of a plasma plume. As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

As described herein, during operation, plasma spray guns are typically mounted on a robotic arm or robotic apparatus. A specimen (e.g., a turbine blade) is typically mounted on a holder at a distance from the plasma spray gun's fore end (exit annulus). This distance is known as the "standoff distance." The standoff distance may be dictated in part by the type of specimen to be sprayed and the type of material to be applied. During operation, plasma spray leaves the gun's exit annulus and is propelled toward the specimen. Spraying different specimens, or different portions of the same specimen, may require using different plasma spray guns with different power levels. For example, in order to spray at a higher power level, a first plasma spray gun may be removed from the robotic arm and replaced with a larger (e.g., longer) plasma spray gun. While the larger plasma spray gun allows for plasma spraying at a higher power level, it may also require extensive operational modifications before it can begin spraying the specimen. For example, when the larger gun is mounted to the robotic arm previously configured for the smaller gun, the increased length of the larger gun means that the standoff distance is reduced. In this case, in order to maintain the proper standoff distance, the robotic arm may require adjusting (e.g., via reprogramming). This reprogramming step may be inconvenient to the operator and cause delays in the spraying process.

U.S. Pat. No. 8,237,079, entitled, "Adjustable Plasma Spray Gun", assigned to the General Electric Company of Schenectady, N.Y., describes an adjustable plasma spray gun that remedies some of the shortcomings of the older conventional approaches noted herein. The adjustable plasma spray gun can efficiently adapt to different plasma spray power needs without the need to move (e.g., reprogram) the robotic arm or apparatus. Specifically, the adjustable plasma spray gun may extend and/or retract at an aft end.

However, the inventors discovered that the adjustable plasma spray gun described in U.S. Pat. No. 8,237,079 could be enhanced using an adjustable gas distribution assembly, described herein according to various embodiments of the invention.

Various particular embodiments of the invention include an adjustable gas distribution assembly for an adjustable plasma spray device. The assembly can include: a first gas distribution ring including a plurality of openings allowing a gas to pass to an inner diameter thereof, the gas distribution ring including a mating surface upstream of the plurality of openings; and a positioning ring axially aligned with the gas distribution ring between the first gas distribution ring and an electrically charged outlet of the plasma spray device, wherein the positioning ring includes a mating surface that mates with the mating surface of the first gas distribution ring to form the gas distribution assembly, wherein the mating surface of the positioning ring is sized to mate with a plurality of distinct gas distribution rings including the first gas distribution ring.

Various other particular embodiments of the invention include an adjustable plasma spray device. The device can include: an electrode body housing an electrode; a plasma spray device body having a fore portion and an aft portion, the aft portion having an axial opening configured to removably attach to one of the electrode or a first coupler; the first coupler removably attached to the plasma spray device body at the axial opening of the plasma spray device body, the coupler including: a first portion having a first axial opening configured to removably attach to the plasma spray gun body; and a second portion having a second axial opening configured to removably attach to one of the electrode body or a second coupler; and an adjustable gas distribution assembly within the plasma spray device body, the adjustable gas distribution assembly including: a first gas distribution ring including a plurality of openings allowing a gas to pass to an inner diameter thereof, the gas distribution ring including a mating surface upstream of the plurality of openings; and a positioning ring axially aligned with the gas distribution ring between the first gas distribution ring and an electrically charged outlet of the plasma spray device body, wherein the positioning ring includes a mating surface that mates with the mating surface of the first gas distribution ring to form the gas distribution assembly, wherein the mating surface of the positioning ring is sized to mate with a plurality of distinct gas distribution rings including the first gas distribution ring.

Further particular embodiments of the invention include an adjustable plasma spray gun system. The system can include: an electrode body housing an electrode; a plasma spray device body having a fore portion and an aft portion, the plasma spray device body housing a nozzle and having an axial opening at the aft portion configured to removably attach to one of the electrode or a coupler; the coupler removably attached to the plasma spray device body at the axial opening of the plasma spray device body, the coupler including: a first portion having a first axial opening configured to removably attach to the plasma spray device body at the aft portion; and a second portion having a second axial opening configured to removably attach to one of the electrode body or a second coupler; and an adjustable gas distribution assembly within the plasma spray device body, the adjustable gas distribution assembly including: a first gas distribution ring including a plurality of openings allowing a gas to pass to an inner diameter thereof, the gas distribution ring including a mating surface upstream of the plurality of openings; and a positioning ring axially aligned with the gas distribution ring between the first gas distribution ring and an electrically charged outlet of the plasma spray device body.

Turning to FIG. 1, a plasma spray gun system 5 is shown including a adjustable plasma spray gun apparatus 10, a specimen 110, a specimen holder 112 (shown in phantom), a robotic arm 114 (shown in phantom) and one or more injector ports 116 (shown in phantom). Adjustable plasma spray gun apparatus 10 may include a plasma spray gun body 20, which may hold a plasma spray gun nozzle 12 (shown in phantom). Plasma spray gun body 20 and plasma spray gun nozzle 12 may share an exit annulus 14, and may be electrically connected. Plasma spray gun body 20 may further include one or more mounts 22 for attaching to robotic arm 114, and a port 24 for receiving and/or expelling water from an external source (not shown). Port 24 may also connect to an external electric power supply (not shown). Plasma spray gun body 20 may be removably attached to an electrode body 40 at one portion, however, plasma spray gun body 20 is electrically insulated from the electrode housed within electrode body. Electrode body 40 may include a plasma gas port 42 for receiving a plasma gas from an external source (not shown), and a port 44 for receiving and/or expelling water from an external source (not shown). Port 44 may also connect to an external electric power supply (not shown). Descriptions of external water, electric power and gas supplies, as well as cooling systems, are omitted herein, and function substantially similarly to those known in the art. Plasma spray gun apparatus 10 may have a length L1, which may include the distance from approximately the aft end of electrode (farthest end from specimen 110) to exit annulus 14. The distance between exit annulus 14 and specimen 110 is shown as the standoff distance SD. As further described herein and illustrated in the Figures, plasma spray gun system 5 may allow for spraying one or more specimens 110 at different power levels while maintaining a fixed standoff distance SD.

During operation of plasma spray gun system 5, an arc is formed inside electrode body 40 and plasma spray gun body 20, where electrode body 40 acts as a cathode electrode and plasma spray gun body 20 acts as an anode. Plasma gas is fed through plasma gas port 42, and extends the arc to exit annulus 14, where injector ports 116 may supply feedstock material into a plasma jet stream 45 as it leaves plasma spray gun body 20 and plasma spray gun nozzle 12 via exit annulus 14. Injector ports 116 may allow for radial supply of feedstock into plasma jet stream 45. Feedstock may be, for example, a powder entrained in a carrier gas and/or a suspension solution. However, feedstock used in the embodiments described herein may be any feedstock material used in plasma spraying. Plasma jet stream 45, including feedstock, is then propelled toward specimen 110, thereby coating it. Standoff distance SD is designed so as to optimize spraying conditions for a particular specimen 110.

Figure 2:
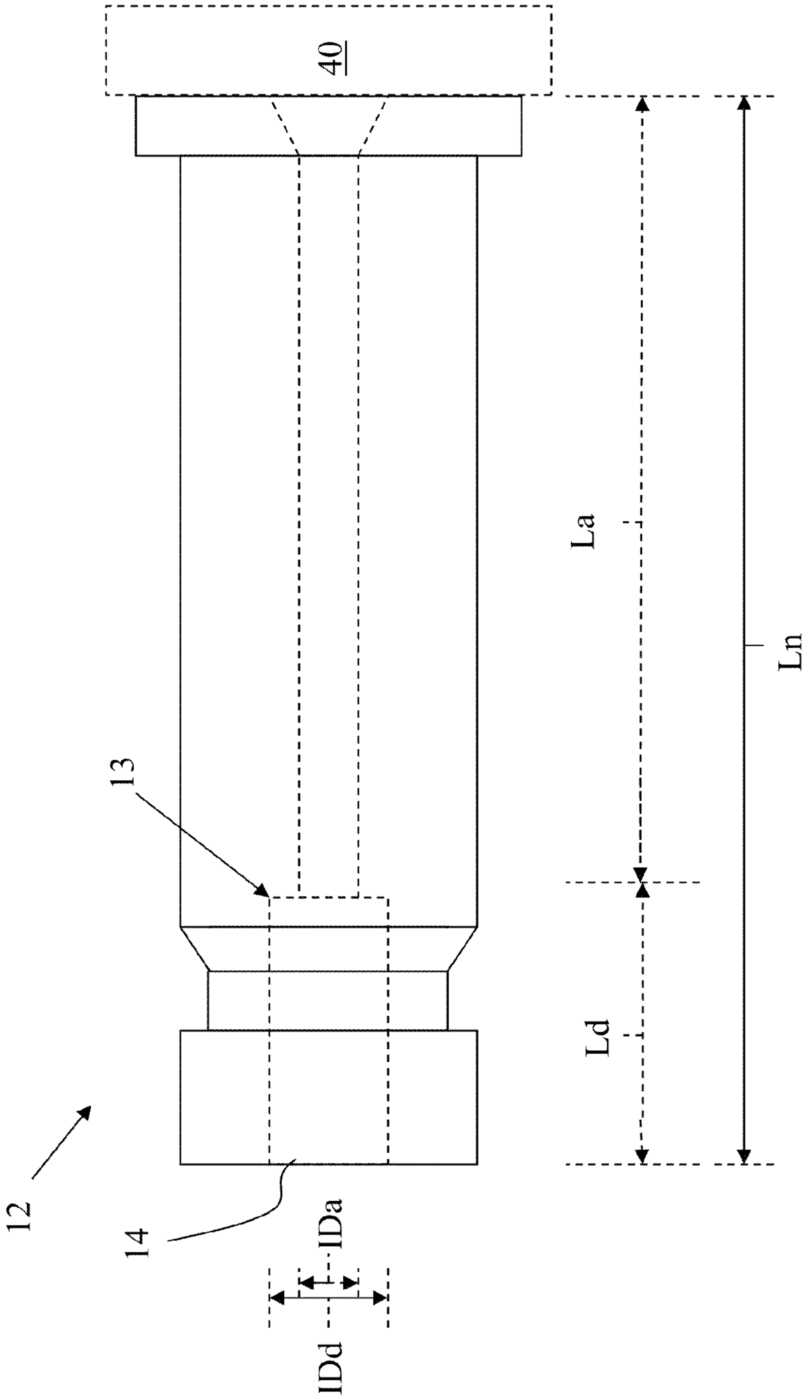
FIG. 2 shows a side view of a plasma spray gun nozzle according to an embodiment of the invention.

The power of a plasma spray gun is partly driven by the length of its plasma "arc" (arc length). The arc length is a component of the total length of plasma spray gun nozzle 12. Turning to FIG. 2, a side view of one embodiment of plasma spray gun nozzle 12 (nozzle) is shown. Also included in FIG. 2 is a portion of electrode body 40 (shown in phantom). Nozzle 12 may have an inner diameter of its arc portion (IDa), and an inner diameter of its divergent portion (IDd). In one embodiment, nozzle 12 may have an IDa of approximately 0.348 inches, and an IDd of approximately 0.602 inches. Inner diameter of the arc portion (IDa) will affect the exit velocity of the plasma gas leaving exit annulus 14, and will also affect the velocity of the sprayed materials at impact on specimen 110. In one embodiment, for higher velocity operation, IDa may be approximately 0.275 inches.

As shown in FIG. 2, plasma spray gun nozzle 12 has a total length (Ln), which includes an arc length (La) and a divergence length (Ld). Arc length (La) is the portion of total length (Ln) over which the plasma arc is formed, and extends between the electrode (within electrode body 40) and an arc root attachment 13. As described with reference to FIG. 1, plasma gas is heated due to the electrical potential difference (or arc voltage) between the electrode (within electrode body 40) and arc root attachment 13. The plasma gas then expands and/or cools over divergent length (Ld) before it is released from plasma spray gun apparatus 10 (FIG. 2) and impacts specimen 110 (FIG. 1). Divergent length (Ld) is chosen in order to prevent the arc root from extending beyond exit annulus 14. The power output of plasma gun apparatus 10 is partially dependent on the arc voltage, which in turn is partially dependent on arc length (La). As such, in order to reduce the power output of plasma spray gun apparatus 10, a smaller arc length (La) may be required. Conversely, to increase the power output of a plasma spray gun, a larger arc length (La) may be required. However, modifying the total length (Ln) of plasma spray gun nozzle 12 requires modifying the overall length (L1) of plasma spray gun apparatus 5 (FIG. 1). In order to maintain the length of plasma spray gun body 20 while modifying the arc length (La) of plasma spray gun nozzle 40, one or more couplers 30, 50 (FIGS. 3-5) may be used. It is understood that plasma spray gun body 20 may include a water sleeve (not shown) at least partially surrounding nozzle 12, to allow for coolant to flow around the exterior of nozzle 12. However, depiction and description of the water sleeve have been omitted from this description for the purposes of clarity.

Figure 3:
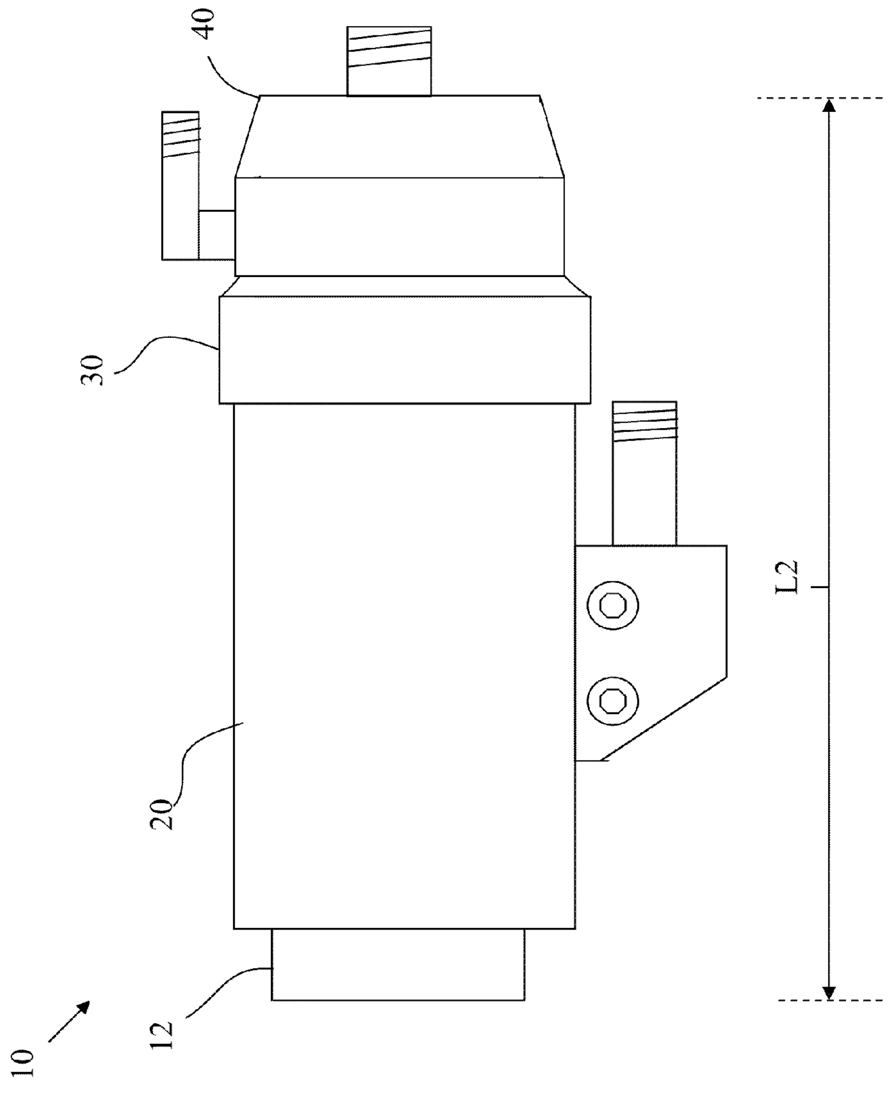
FIG. 3 shows a side view of an adjustable plasma spray gun apparatus according to an embodiment of the invention.
Figure 6:
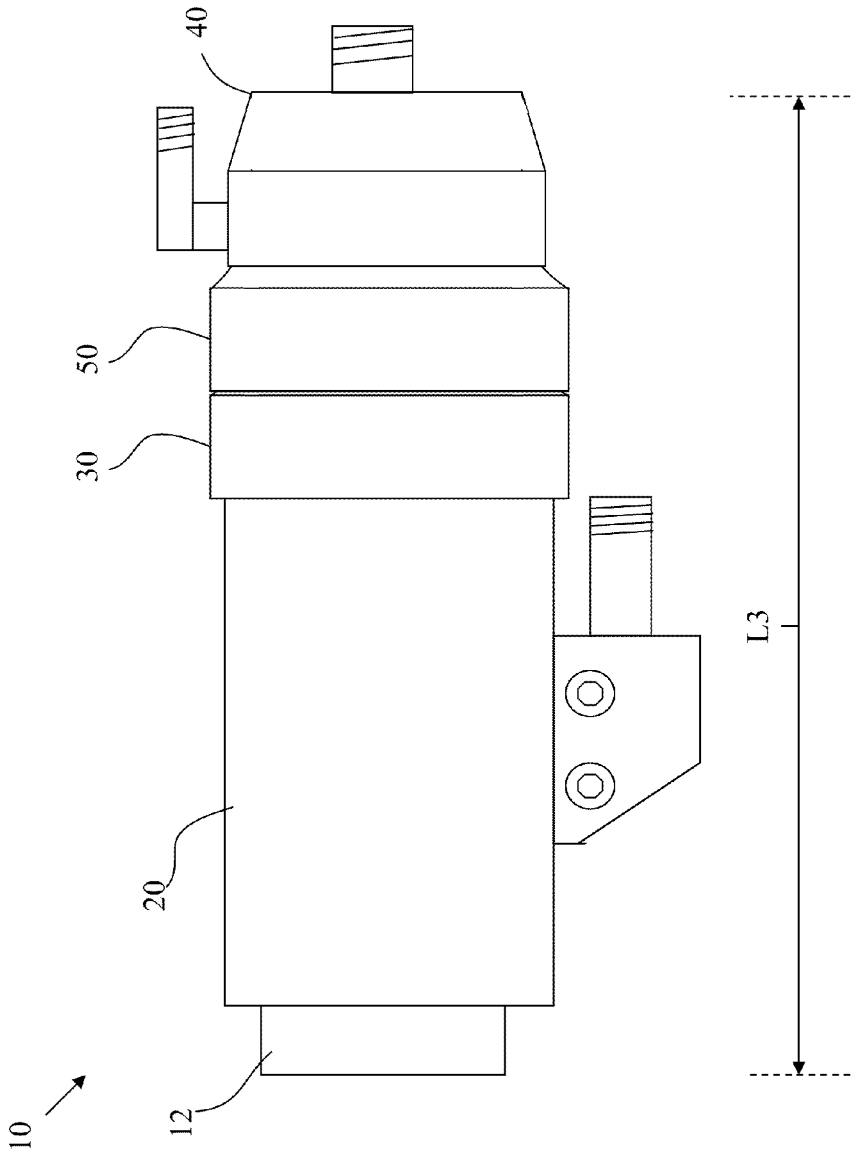
FIG. 6 shows a side view of an adjustable plasma spray gun apparatus according to an embodiment of the invention.

Turning to FIG. 3, a side view of one embodiment of an adjustable plasma spray gun apparatus 10 is shown. Adjustable plasma spray gun apparatus 10 may include plasma spray gun body 20 housing nozzle 12, a coupler 30 and an electrode body 40 housing an electrode. In this embodiment, adjustable plasma spray gun apparatus 10 may have a total length L2, which is greater than the total length L1 shown and described with reference to FIG. 1 In one embodiment, where adjustable plasma spray gun apparatus 10 has a length L1 (FIG. 1), it may produce a minimum power level (e.g., 50 kW). In contrast, in another embodiment, where adjustable plasma spray gun apparatus 10 has a length L2, it may produce a greater power level (e.g., 100 kW, 150 kW). It is understood that in different embodiments of the invention, adjustable plasma spray gun apparatus 10 may produce an even greater power level (e.g., 200 kW), and have a different length (L3)(FIG. 6). Power levels of adjustable plasma spray gun apparatus 10 may be manipulated using one or more couplers 30, 50 (FIG. 6), one of a plurality of plasma spray gun nozzles 12 (FIG. 7).

Figure 4:
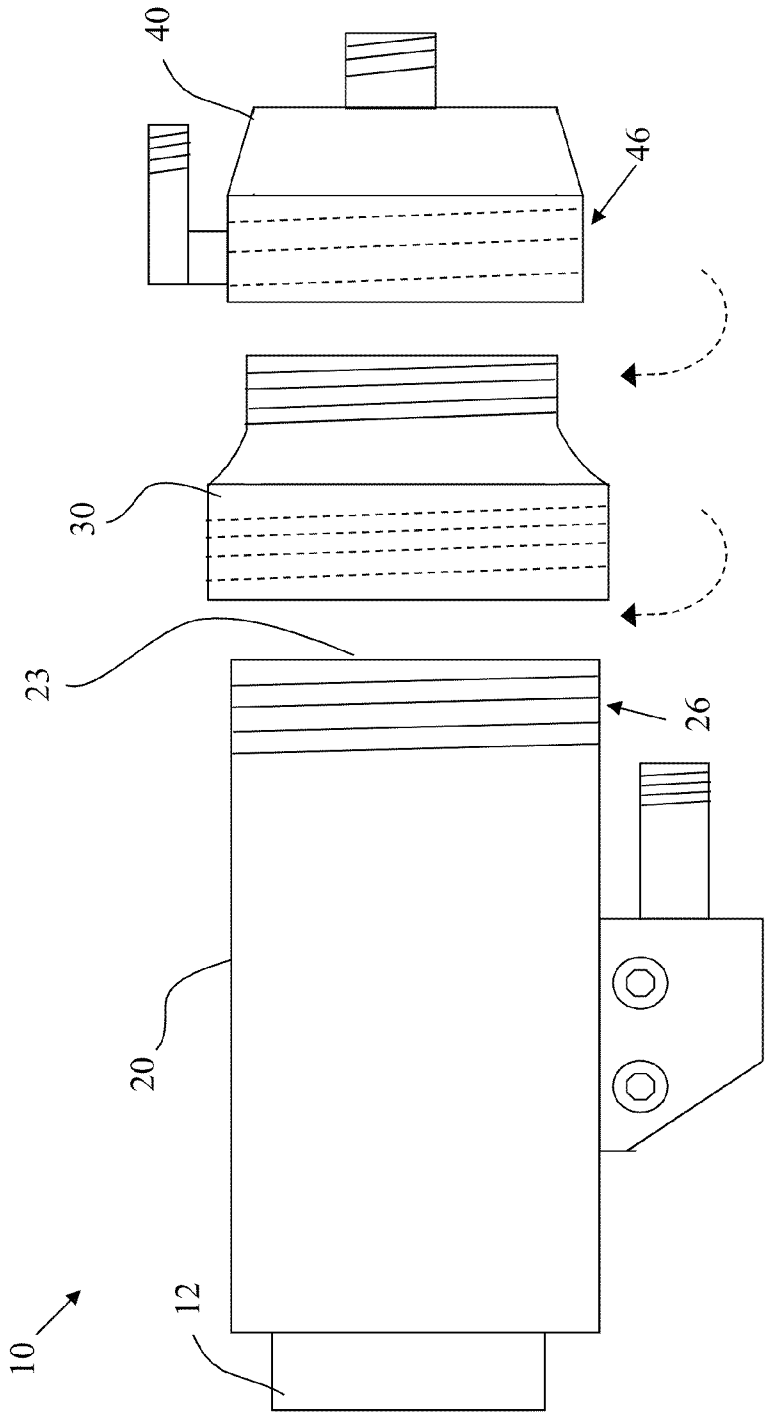
FIG. 4 shows a side view of components of an adjustable plasma spray gun apparatus according to an embodiment of the invention.

Turning to FIG. 4, a side view of separated components of adjustable plasma spray gun apparatus 10 is shown. As shown in FIG. 4, adjustable plasma spray gun apparatus 10 may include plasma spray gun body 20 housing nozzle 12, coupler 30 and electrode body 40 housing an electrode. Components of adjustable plasma spray gun apparatus 10 are shown separated, and not in their functional state, for illustrative purposes. However, as indicated by the dashed arrows, coupler 30 is configured to removably attach to plasma spray gun body 20. Further, electrode body 40 is configured to removably attach to either coupler 30 (as shown), or directly to plasma spray gun body 20 (not shown). In one embodiment, plasma spray gun body 20 may have an axial opening 23, and may include a plurality of external threads 26 for removably attaching to coupler 30 or electrode body 40. External threads 26 may be complementary to internal threads of coupler 30 (FIG. 5A) and electrode body 40. In one embodiment, plasma spray gun apparatus 10 is configured to operate at approximately 70 percent thermal efficiency and greater than approximately 70 percent deposition efficiency throughout a plasma spray gun apparatus power range of approximately 50 kW to approximately 200 kW. That is, in this embodiment, plasma spray gun body 20 may remain affixed on a robotic arm or the like, while performing efficient plasma spraying at a wide range of power modes.

Figure 5B:
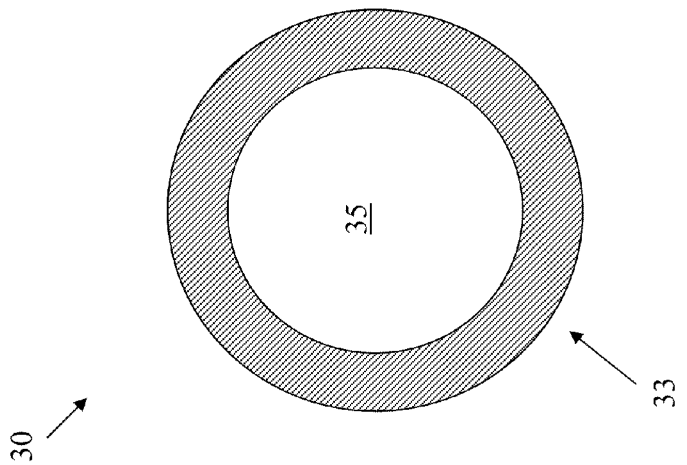
FIG. 5B shows a cross-sectional front view of the coupler of FIG. 5A.
Figure 5A:
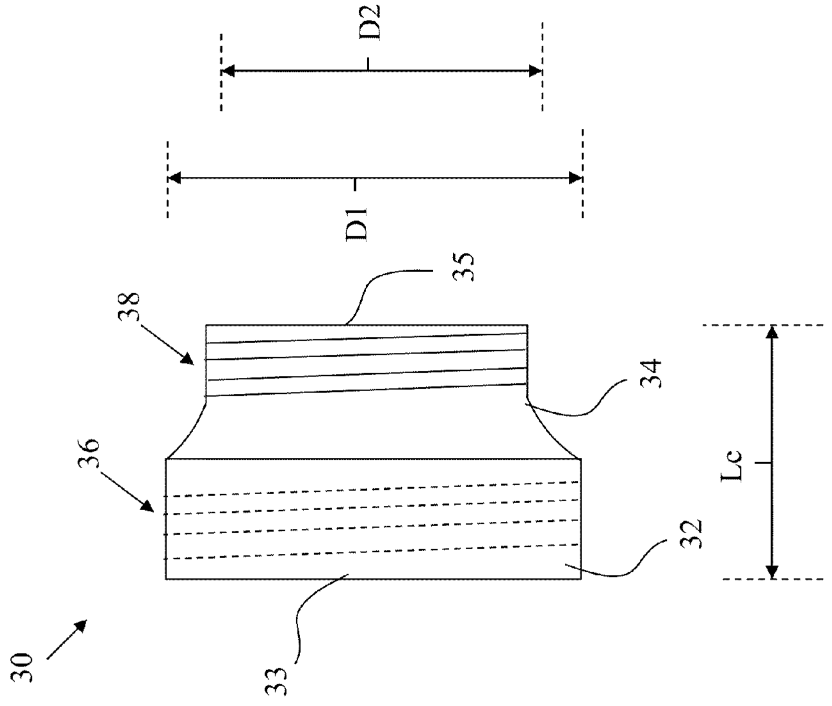
FIG. 5A shows a side view of a coupler according to an embodiment of the invention.

Turning to FIGS. 5A and 5B, a side view and a cross-sectional front view, respectively, of coupler 30 are shown. FIGS. 5A-5B show one embodiment of coupler 30, including a first portion 32 having a first axial opening 33 including a plurality of internal threads 36. In this embodiment, first portion 32 may be configured to removably attach to plasma spray gun body 20 via plurality of internal threads 36 (of coupler 30) and external threads 26 of plasma spray gun 20 (FIG. 4). In this embodiment plasma spray gun body 20 may remain affixed to, for example, a robotic arm, while coupler 30 is rotatably affixed to gun body 20. This may involve, for example, a human operator physically rotating first portion 32 about external threads 26 of plasma spray gun body 20. It is understood that while components of adjustable plasma spray gun apparatus 10 (FIG. 4) are shown and described herein as being removably attached to one another via complementary threads, other forms of removable attachment are possible. For example, components of adjustable plasma spray gun apparatus 10 may be removably attached to one another via bayonet-type connectors or other suitable connectors. In one embodiment, coupler 30 may have a major diameter D1 (first portion 32) of approximately 2.745 inches (in) and a minor diameter D2 (second portion 34) of approximately 2.375 in. In this embodiment, coupler 30 may further have a length (Lc) of approximately 1.373 inches. It is understood that multiple couplers 30 may be used to extend the length (L) of adjustable plasma spray gun apparatus 10, and that couplers having different lengths (Lc) may be used alone, or in conjunction with additional couplers 50 (FIG. 5).

With continuing reference to FIGS. 5A-5B, and FIG. 4, coupler 30 is further shown including a second portion 34, having a second axial opening 35. In one embodiment, coupler 30 may include a plurality of external threads 38. In this case, second portion 34 may be configured to removably attach to one of electrode body 40 or a second coupler (not shown) via external threads 38 and internal threads 46 of electrode body 40. It is understood, however, that second portion 34 may be configured to removably attach to one of electrode body 40 or a second coupler via any means described with respect to first portion 32 and plasma spray gun body 20. Further, second portion 34 and first portion 32 may removably attach to other components of adjustable plasma spray gun apparatus 10 in manners distinct from one another. For example, first portion 32 may include a plurality of external threads, while second portion 34 may include another attachment mechanism (e.g., portions of a clasping mechanism, apertures for receiving screws or bolts, a bayonet-type connection etc.). In the case that second portion 34 includes external threads 38, internal threads 46 of electrode body 40 may complement external threads 38 of coupler 30, as well as external threads 26 of plasma spray gun body 20. Further, multiple couplers 30 may be removably attached to one another via, for example, their internal threads 36 and external threads 38, respectively, which complement each other. That is, the length (L1) of adjustable plasma spray gun apparatus 10 may be manipulated by the addition or subtraction of one or more couplers 30 to plasma spray gun body 20.

For example, as shown in FIG. 6, in one embodiment, adjustable plasma spray gun apparatus 10 may include plasma spray gun body 20 housing nozzle 12, first coupler 30, a second coupler 50, and electrode body 40. In this embodiment, second coupler 50 may be removably attached to first coupler 30 and electrode body 40. In one embodiment, second coupler 50 may be removably attached to first coupler 30 and electrode body 40 via internal and external threads (not shown), respectively. Second coupler 50 may have a substantially similar attachment mechanism (e.g., threads, clasps, bayonet-type connections, etc.) as first coupler 30, which may facilitate attachment of first coupler 30 and second coupler 50. Second coupler 50 may be substantially similar in length to first coupler 30, or may have a substantially different length (Lc) (FIG. 5) than first coupler 30. In one embodiment, second coupler 50 may have a length (Lc) approximately twice that of first coupler 30. In another embodiment, second coupler 50 may have a length (Lc) of approximately 2.183 inches, this length being less than twice that of first coupler 30. In any case, second coupler 50 may allow for extension of adjustable plasma spray gun apparatus 10 to a length L3. As described herein, adjusting the length (L1, L2, L3) of plasma spray gun apparatus 10 may allow for increased or decreased power output, which may accommodate plasma spraying of a range of parts and materials without the need to remove plasma spray gun body 20 from robotic arm 114 (or the like). This may also for adjusting the length (L1, L2, L3) of plasma spray gun apparatus 10 from the aft portion (opposite exit annulus 14) without changing the designed standoff distance SD.

Turning to FIG. 7, a table 100 illustrating performance-related aspects of embodiments of the present invention is shown. In particular, FIG. 7 illustrates a plurality of example plasma spray nozzles with various arc lengths that are possible using the plasma spray gun apparatus 10 of the present invention. As shown, a plurality of plasma spray gun nozzles 12 (e.g., Nozzles 50, 100, etc.) are compatible with plasma spray gun apparatus 10. The plurality of plasma spray gun nozzles 12, used in conjunction with one or more couplers 30, 50 may allow for an operator (not shown) to modify the power output of plasma spray gun apparatus 10 while not modifying the designed standoff distance SD. For example, Nozzle 150 may be used to produce a power output of approximately 150 kW, while Nozzle 50 may be used to produce a power output of approximately 50 kW, one-third the amount used with Nozzle 150. It is understood that plasma spray gun nozzles 12 may be interchanged to achieve thermal efficiency of approximately 70 percent, while maintaining deposition efficiency at or above approximately 70 percent, at a range of different plasma spray power levels (e.g., 100 kW to 200 kW). Different embodiments of plasma spray gun apparatus 10 may be assembled without removal of plasma spray gun body 20 from robotic arm 114 or the like (while maintaining SD), and assembly may be performed in approximately 3-5 minutes by an operator. These configurations may provide for efficient and fast plasma spraying of a variety of surfaces.

Figure 8:
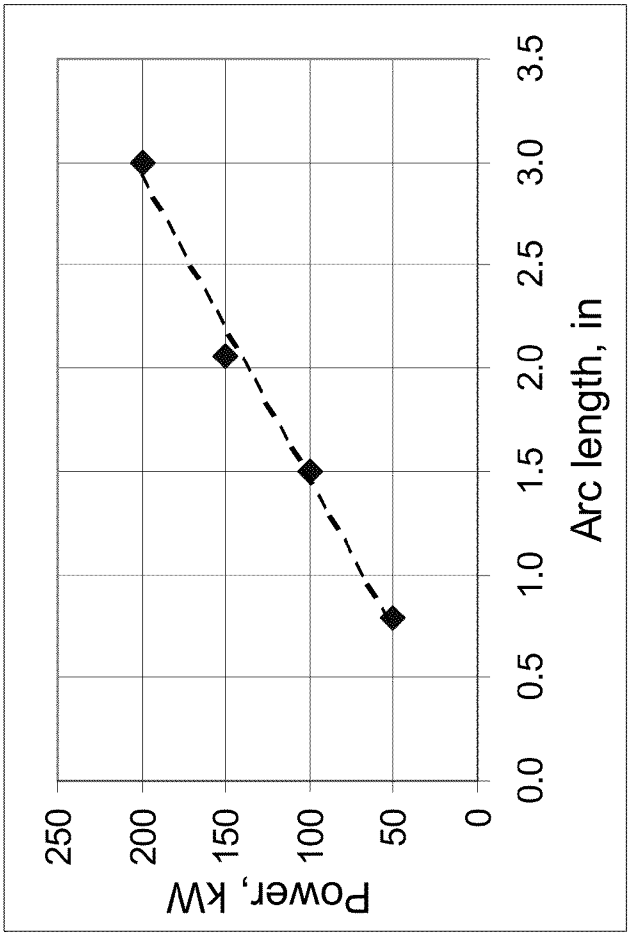
FIG. 8 shows a graph including data about example nozzles used according to embodiments of the invention.

FIG. 8 shows a graph 200, illustrating power versus arc length data as measured according to embodiments of the invention listed in table 100 (FIG. 7). Four data points are illustrated in graph 200, corresponding to power levels and arc lengths, respectively, of: 50 kW, 0.79 in; 100 kW, 1.50 in; 150 kW, 2.06 in; and 200 kW, 3.00 in.

Figure 9:
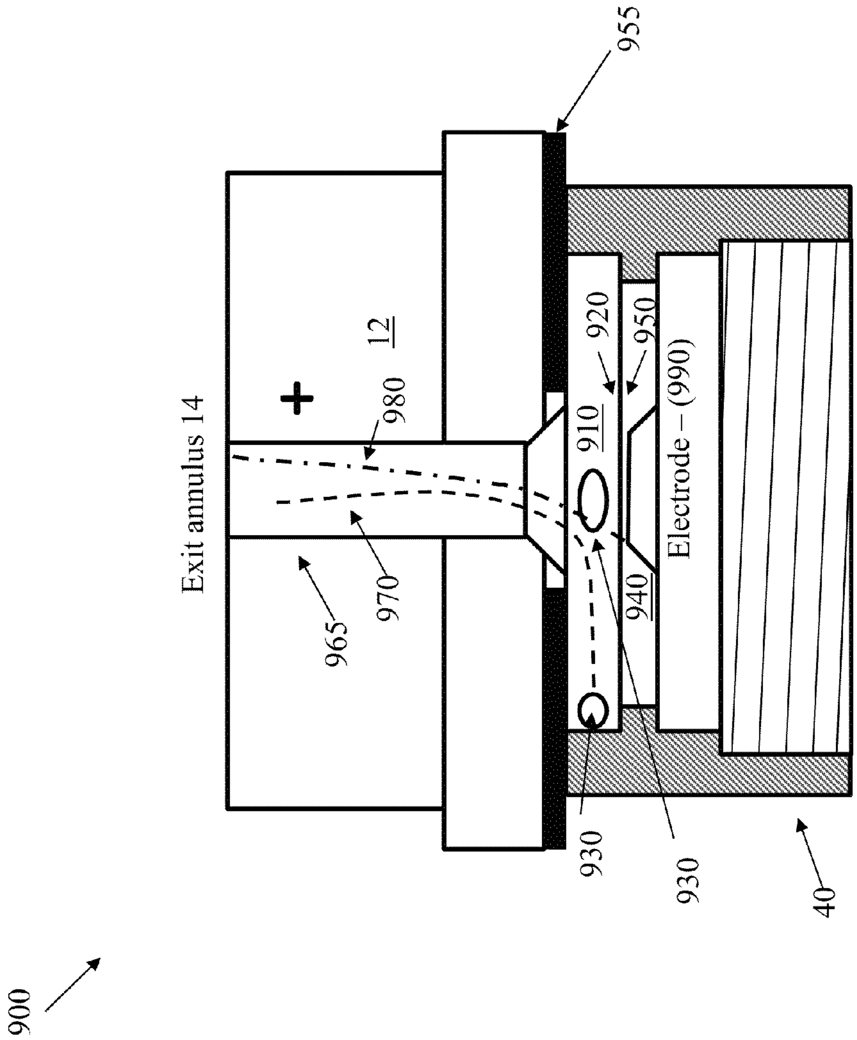
FIGS. 9-10 show schematic side views of adjustable gas distribution assemblies according to various embodiments of the invention.

FIG. 9 shows a schematic three-dimensional perspective view of an adjustable gas distribution assembly 900, for use in the adjustable plasma spray devices (e.g., adjustable plasma spray device 10) devices shown and described herein. As shown, the adjustable gas distribution assembly 900 can include a first gas distribution ring 910 including a plurality of openings 930 allowing a gas (e.g., a plasma gas) to pass to an inner diameter 148 thereof. The inner diameter 148 of a first gas distribution ring is illustrated in the top view of a gas distribution ring in FIG. 12. Returning to FIG. 9, with continuing reference to FIGS. 3, 4 and 6, the adjustable gas distribution assembly 900 can be positioned within the plasma spray gun body 20 and/or the electrode body 40, and can act as a passageway for the plasma entering through inlet 42 and flowing through the nozzle 12. As shown, the first gas distribution ring 910 can also include a mating surface 920 upstream (axially upstream) of the plurality of openings 930. Also shown, the gas distribution assembly 900 can include a positioning ring 940 axially aligned with the first gas distribution ring 910 between the first gas distribution ring 910 and the electrode 990. Coupled to an opposite side of the first gas distribution ring 910 is the nozzle section 12, with an insulator layer 955 interposed between the nozzle section 12 and the first gas distribution ring 910. At an end of the nozzle section 12 is an electrically charged outlet (e.g., exit annulus 14) of the plasma spray device 10.

Figure 10:
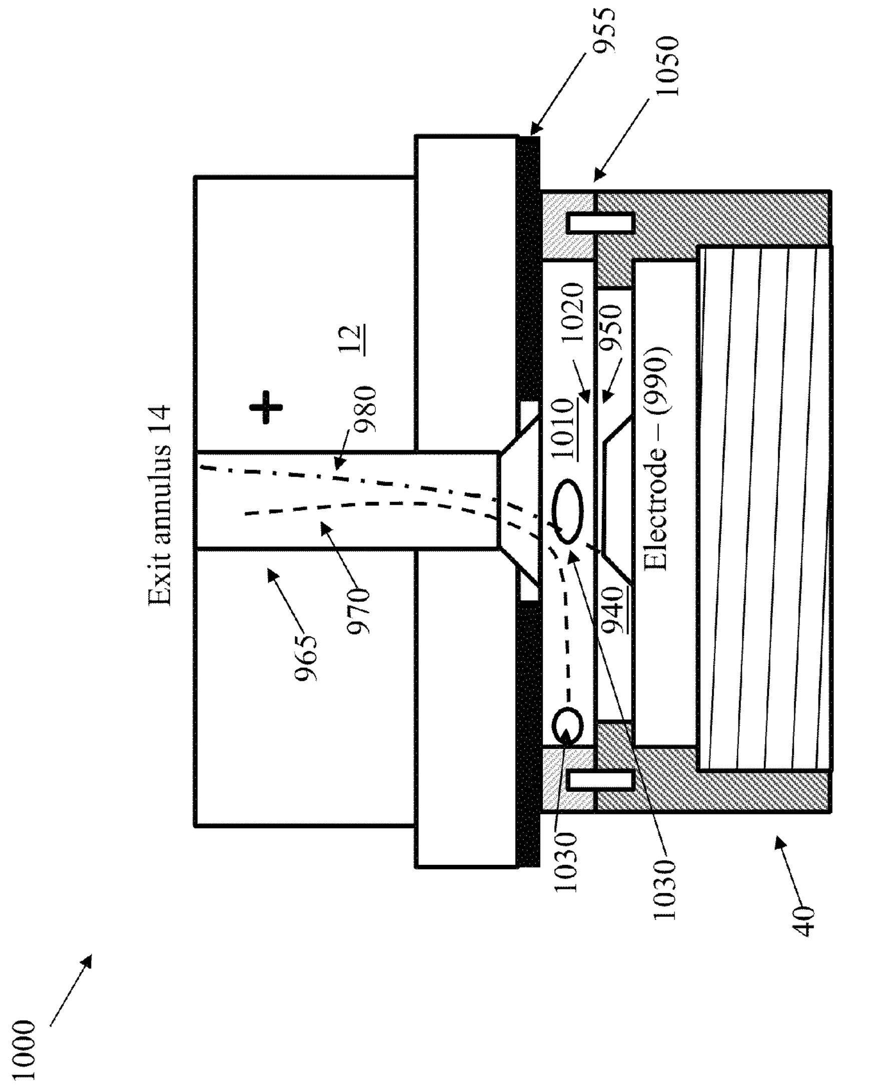

The positioning ring 940 can include a mating surface 950 that mates with (or is sized to mate with) the mating surface 920 of the first gas distribution ring 910. The mating surface 950 of the positioning ring 940 is sized to mate with a plurality of distinct gas distribution rings (further described herein), including the first gas distribution ring 910. As shown, in various embodiments, the positioning ring 940 and the first gas distribution ring 910 can be coupled to one another in a unitary manner, e.g., they can form one continuous unit (as shown in FIG. 9). However, in other embodiments, the positioning ring 940 and the first gas distribution ring 910 can be separate components joined at a junction 1050 (in the adjustable gas distribution assembly 1000 of FIG. 10), e.g., allowing for first gas distribution ring 910 to be removed and replaced with a distinct gas distribution ring depending upon the desired output of the adjustable plasma spray device 10. FIGS. 9 and 10 show the path of inlet gas 970 entering one of the plurality of openings 930 and joining the spark 980 from the electrode 990 in the electrode body 40.

That is, in some embodiments, the positioning ring 940 is configured to mate with distinct gas distribution rings, which can be sized according to the desired length (and corresponding power output of the plasma spray device 10). In various embodiments, the adjustable gas distribution assemblies 900, 1000 (FIG. 10) allows for distinct levels of gas to flow therethrough (using adjustable inlet settings), effectively modifying the maximum power output of the plasma spray device 10 along with the overall length (including arc length, La and/or divergence length, Ld) of the spray device 10.

In some embodiments, the first gas distribution ring 910 and the positioning ring 940 are substantially non-unitary (FIG. 10). That is, in some embodiments, the first gas distribution ring 910 and the positioning ring 940 are detachably coupled such that an operator (e.g., a human user) could couple and de-couple the first gas distribution ring 910 and the positioning ring 940. In some cases, the respective mating surfaces 920, 950 can include complementary grooves, tabs, male/female slots, threads, etc. for coupling the first gas distribution ring 910 with the positioning ring 940.

FIG. 10 illustrates another embodiment of the invention showing an adjustable gas distribution assembly 1000 that includes a second gas distribution ring 1010 distinct from the first gas distribution ring 910, and includes a mating surface 1020 sized to mate with the mating surface 950 of the positioning ring 940. Similarly to the first gas distribution ring 910, the second gas distribution ring 1010 can include a plurality of openings 1030 allowing the gas to pass to an inner diameter thereof. The plurality of openings 1030 in the second gas distribution ring 1010 can have a distinct inner diameter (id) from the plurality of openings 930 in the first gas distribution ring 910, allowing for a distinct amount of the gas to pass to the inner diameter thereof at a given time, thereby accelerating or decelerating the gas with respect to the first gas distribution ring 910.

In various embodiments, the second gas distribution ring 1010 and the first gas distribution ring 910 are interchangeable with the positioning ring 940. That is, in these cases, the second gas distribution ring 1010 and the first gas distribution ring 910 include mating surfaces 920, 1020 that are compatible with the mating surface 950 of the positioning ring 940. It is understood that further gas distribution rings, e.g., a third gas distribution ring, fourth gas distribution ring, etc. could be utilized in various embodiments, where each gas distribution ring includes a set of openings that has a distinct inner diameter from the set of openings on the other gas distribution ring(s). In these cases, each gas distribution ring provides a distinct flow velocity for the gas entering the nozzle 12, where the flow velocity is particularly tailored for the overall nozzle length (and maximum power output) of the plasma device 10.

As noted herein, in some embodiments, the first gas distribution ring 910 and the positioning ring 940 can be substantially affixed to one another. In these cases, the first gas distribution ring 910 and the positioning ring 940 can form a substantially unitary structure, that is, one that is cannot be separated by an ordinary operator (FIG. 9). In these embodiments, as shown in the close-up schematic depiction in FIG. 11, in order to modify the velocity of the plasma gas that enters the nozzle region in accordance with the distinct power output levels, the first gas distribution ring 910 can include at least two distinct sets of openings 1110, 1120. In some cases, the distinct sets of openings 1110, 1120 each have a distinct inner diameter (id) (or simply, width) for allowing a distinct amount of the gas to pass to the inner diameter of the ring 910 at a given time. As is understood by one having skill in the art, a smaller inner diameter (id) in one set of openings 1110 versus another set of openings 1120 (with a larger inner diameter) will cause the plasma gas to accelerate through the openings 1110 with the smaller inner diameter as compared to the larger openings 1120.

In various embodiments, the first set of openings 1110 and second set of openings 1120 can have distinct injection angles (e.g., forward (F), backward (B) and neutral (N)). The distinct injection angles can modify an inlet velocity of the gas entering the ring 910, which can consequently alter the amount, velocity and/or trajectory of plasma produced and discharged at the exit annulus 14.

Figure 11:
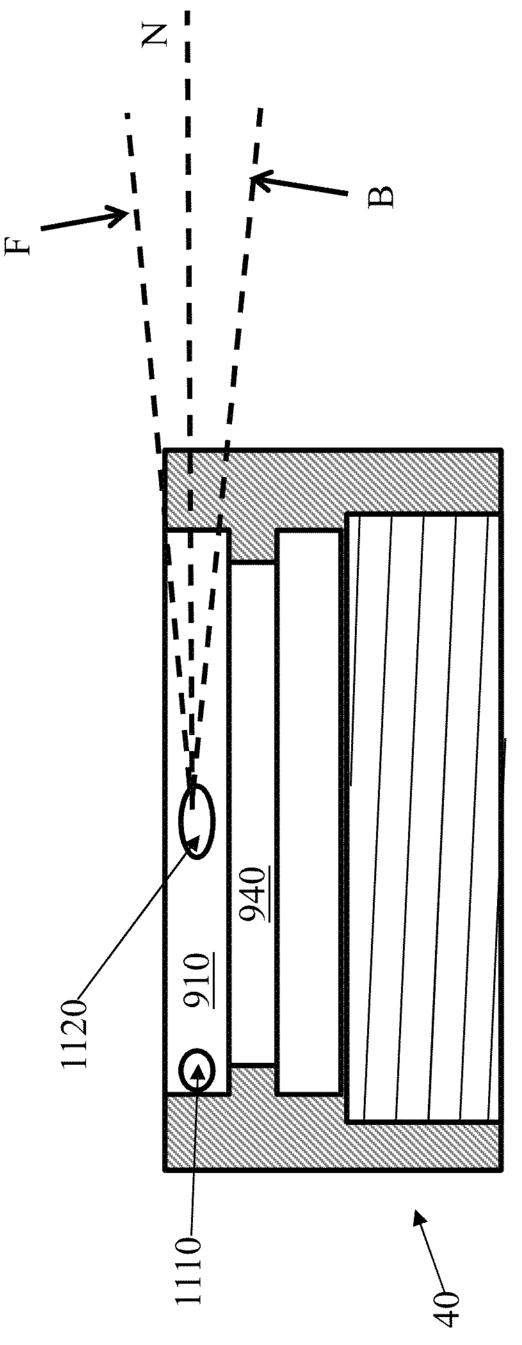
FIG. 11 shows a schematic side view of a section of an adjustable gas distribution assembly according to various embodiments of the invention.
Figure 12:
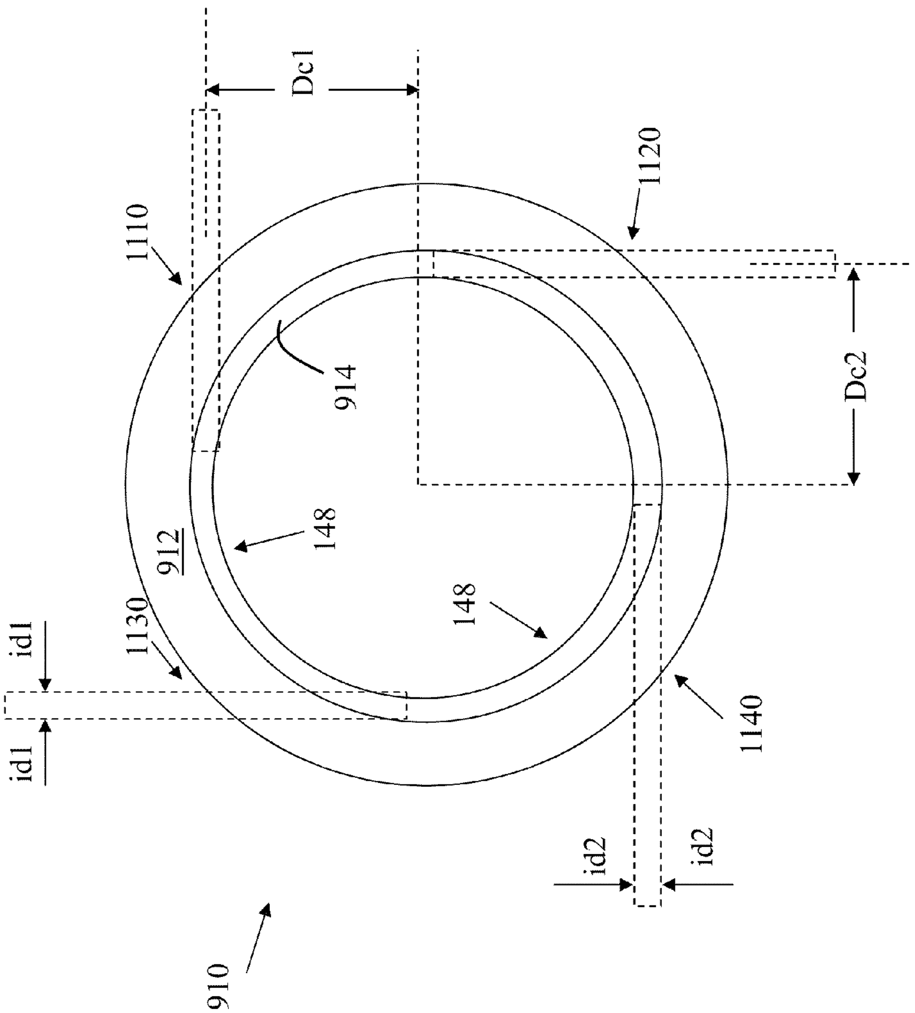
FIG. 12 shows a top (or end) view of a gas distribution ring according to various embodiments of the invention.

FIG. 12 shows a top view of another embodiment of a first gas distribution ring 910, which can include distinct sets of openings (e.g., openings 1110, 1120) as described with respect to FIG. 11. In this embodiment, the openings 1110, 1120 can include openings having distinct distances to the inner diameter 148, e.g., locations and angles of entry through the outer ring 912 and inner ring 914 that differ between the first set of openings 1110 and the second set of openings 1120. In some cases, a distance to the center (Dc1) from a first opening 1110 is distinct from a second distance to the center (Dc2) from a second opening. FIG. 12 also illustrates embodiments in which a first opening 1130 has a distinct inner diameter (id1) than an inner diameter (id2) of a second opening 1140.

It should be understood that the preceding figures and written description include examples of embodiments of an adjustable plasma spray gun. It is understood that specific numerical values (e.g., physical dimensions, power levels, etc.) are included merely for illustrative purposes, and are not limiting. The teachings of this written description may be applied to plasma spray gun systems having, for example, different sized components functioning at different power levels than those described herein and/or illustrated in the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An adjustable gas distribution assembly for an adjustable plasma spray device, comprising:

a first gas distribution ring including a plurality of openings allowing a gas to pass to an inner diameter thereof, the first gas distribution ring including a mating surface upstream of the plurality of openings;

a second gas distribution ring including a plurality of openings allowing a gas to pass to an inner diameter thereof, the second gas distribution ring including a mating surface upstream of the plurality of openings, wherein a first distance from the plurality of openings of the first gas distribution ring to a center of the first gas distribution ring is distinct from a second distance from the plurality of openings of the second gas distribution ring to a center of the second gas distribution ring; and a positioning ring axially aligned with and between the first gas distribution ring or the second gas distribution ring and an electrically charged outlet of the plasma spray device, wherein the positioning ring includes a mating surface that mates with the mating surface of the first gas distribution ring or the second gas distribution ring, wherein the first gas distribution ring or second gas distribution ring is selected to form the adjustable gas distribution assembly, wherein the first gas distribution ring and the second gas distribution ring are interchangeable in the gas distribution assembly, wherein the mating surface of the positioning ring is sized to mate with the first gas distribution ring or the second gas distribution ring.

2. The adjustable gas distribution assembly of claim 1, wherein the first gas distribution ring and the positioning ring are substantially non-unitary.

3. The adjustable gas distribution assembly of claim 1, wherein the first gas distribution ring and the second gas distribution ring are interchangeable with the positioning ring.

4. The adjustable gas distribution assembly of claim 1, wherein the first gas distribution ring and the positioning ring are substantially affixed to one another.

5. The adjustable gas distribution assembly of claim 4, wherein the plurality of openings include at least two distinct sets of openings each having a distinct inner diameter for allowing a distinct amount of the gas to pass to the inner diameter thereof.

6. The adjustable gas distribution assembly of claim 5, wherein the plurality of openings include at least two distinct sets of openings each having a distinct injection angle to the inner diameter thereof.

7. An adjustable plasma spray device, comprising:

an electrode body housing an electrode;

a plasma spray device body having a fore portion and an aft portion, the aft portion having an axial opening configured to removably attach to one of the electrode or a first coupler;

the first coupler removably attached to the plasma spray device body at the axial opening of the plasma spray device body, the first coupler including:

a first portion having a first axial opening configured to removably attach to the plasma spray gun body; and a second portion having a second axial opening configured to removably attach to one of the electrode body or a second coupler; and an adjustable gas distribution assembly within the plasma spray device body, the adjustable gas distribution assembly including:

a first gas distribution ring including a plurality of openings allowing a gas to pass to an inner diameter thereof, the first gas distribution ring including a mating surface upstream of the plurality of openings;

a second gas distribution ring including a plurality of openings allowing a gas to pass to an inner diameter thereof, the second gas distribution ring including a mating surface upstream of the plurality of openings, wherein a first distance from the plurality of openings of the first gas distribution ring to a center of the first gas distribution ring is distinct from a second distance from the plurality of openings of the second gas distribution ring to a center of the second gas distribution ring; and a positioning ring axially aligned with and between the first gas distribution ring or the second gas distribution ring and an electrically charged outlet of the plasma spray device body, wherein the positioning ring includes a mating surface that mates with the mating surface of the first gas distribution ring or the second gas distribution ring, wherein the first gas distribution ring or second gas distribution ring is selected to form the adjustable gas distribution assembly, wherein the first gas distribution ring and the second gas distribution ring are interchangeable in the gas distribution assembly, wherein the mating surface of the positioning ring is sized to mate with the first gas distribution ring or second gas distribution ring.

8. The adjustable plasma spray device of claim 7, further including a plasma spray device nozzle at least partially housed within the plasma spray gun body downstream of the adjustable gas distribution assembly.

9. The adjustable plasma spray gun of claim 8, wherein the plasma spray gun nozzle has an overall length, and arc length, respectively, selected from the group consisting of:

approximately 4.12 inches (104.6 mm) and approximately 3.00 inches (76.2 mm);

approximately 3.31 inches (84.1 mm) and approximately 2.06 inches (52.3 mm);

approximately 2.50 inches (63.5 mm) and approximately 1.50 inches (38.1 mm); and approximately 1.69 inches (42.9 mm) and approximately 0.79 inches (20.1 mm).

10. The adjustable plasma spray device of claim 7, wherein the second portion is removably attached to the second coupler, the second coupler having:

a first portion including a first axial opening configured to removably attach to the first coupler; and a second portion having a second axial opening configured to removably attach to one of the electrode body or a third coupler.

11. The adjustable plasma spray device of claim 10, wherein the second coupler has an overall length substantially distinct from the overall length of the first coupler.

12. The adjustable plasma spray device of claim 7, wherein the first coupler is tapered from the first portion toward the second portion.

13. The adjustable plasma spray device of claim 7, wherein the electrode body, the plasma spray gun body and the coupler are configured to:

generate a plasma spray while operating in a power range of approximately 50 kW to approximately 200 kW; and remain at a fixed standoff distance from a specimen while operating in the power range of approximately 50 kW to approximately 200 kW.

14. An adjustable plasma spray gun system, comprising:

an electrode body housing an electrode;

a plasma spray device body having a fore portion and an aft portion, the plasma spray device body housing a nozzle and having an axial opening at the aft portion configured to removably attach to one of the electrode or a coupler;

the coupler removably attached to the plasma spray device body at the axial opening of the plasma spray device body, the coupler including:

a first portion having a first axial opening configured to removably attach to the plasma spray device body at the aft portion; and a second portion having a second axial opening configured to removably attach to one of the electrode body or a second coupler; and an adjustable gas distribution assembly within the plasma spray device body, the adjustable gas distribution assembly including:

a first gas distribution ring including a plurality of openings allowing a gas to pass to an inner diameter thereof, the gas distribution ring including a mating surface upstream of the plurality of openings;

a second gas distribution ring including a plurality of openings allowing a gas to pass to an inner diameter thereof, the second gas distribution ring including a mating surface upstream of the plurality of openings, wherein a first distance from the plurality of openings of the first gas distribution ring to a center of the first gas distribution ring is distinct from a second distance from the plurality of openings of the second gas distribution ring to a center of the second gas distribution ring; and a positioning ring axially aligned with and between the first gas distribution ring or the second gas distribution ring and an electrically charged outlet of the plasma spray device body, wherein the positioning ring includes a mating surface that mates with the mating surface of the first gas distribution ring or the second gas distribution ring, wherein the first gas distribution ring or second gas distribution ring is selected to form the adjustable gas distribution assembly, wherein the first gas distribution ring and the second gas distribution ring are interchangeable in the gas distribution assembly.

15. The adjustable plasma spray gun system of claim 14, wherein the first gas distribution ring and the positioning ring are substantially non-unitary.

16. The adjustable plasma spray gun system of claim 14, wherein the first gas distribution ring and the second gas distribution ring are interchangeable with the positioning ring.

17. The adjustable plasma spray gun system of claim 14, wherein the first gas distribution ring and the positioning ring are substantially unitary, wherein the plurality of openings include at least two distinct sets of openings each having a distinct injection angle to the inner diameter thereof.

* * * * *